May 26, 1931. E. JOHNSON 1,806,904
METHOD OF MIXING LIQUIDS
Filed Jan. 4, 1929 2 Sheets-Sheet 1

INVENTOR
*Earl Johnson.*
BY
ATTORNEY

May 26, 1931.   E. JOHNSON   1,806,904
METHOD OF MIXING LIQUIDS
Filed Jan. 4, 1929   2 Sheets-Sheet 2

INVENTOR
Earl Johnson.
BY
ATTORNEY

Patented May 26, 1931

1,806,904

UNITED STATES PATENT OFFICE

EARL JOHNSON, OF KANSAS CITY, MISSOURI

METHOD OF MIXING LIQUIDS

Application filed January 4, 1929. Serial No. 330,313.

My invention relates to spraying machines and has for its principal objects to mix an auxiliary ingredient with the fluid normally discharged from a spraying machine, and to control the proportion of the auxiliary ingredient to the normal fluid.

In ordinary practice a single substance such as water, or a compound substance or mixture, is provided in a container and moved by a pump or other suitable pressure means through a tube to the spray nozzle. When it is desired to spray two substances separately, the intake of the machine is connected to one or another of separate containers for the two substances, and when it is desired to employ the substances selectively either separately or in a mixture, a third container must be provided for the mixture.

It may happen that the two substances do not mix readily or at all, and even though they might be advantageously sprayed together, they must be sprayed separately by one machine, or two spraying machines must be used. For example, it is desirable under some circumstances as in washing automobiles, to spray a mixture of water and oil but since a stable mixture of these substances cannot be conveniently provided, they must be sprayed separately.

Further objects of the invention therefore are to provide for selective discharge of a primary spray substance, a secondary spray mixture, or a combination of the primary substance with the mixture by a single machine and spray nozzle simultaneously, and for control of the proportions of the mixture or combination.

In accomplishing these and other objects of the invention I have provided improved details of structure, the preferred forms of which are illustrated in the accompanying drawings, wherein.

Figure 1:
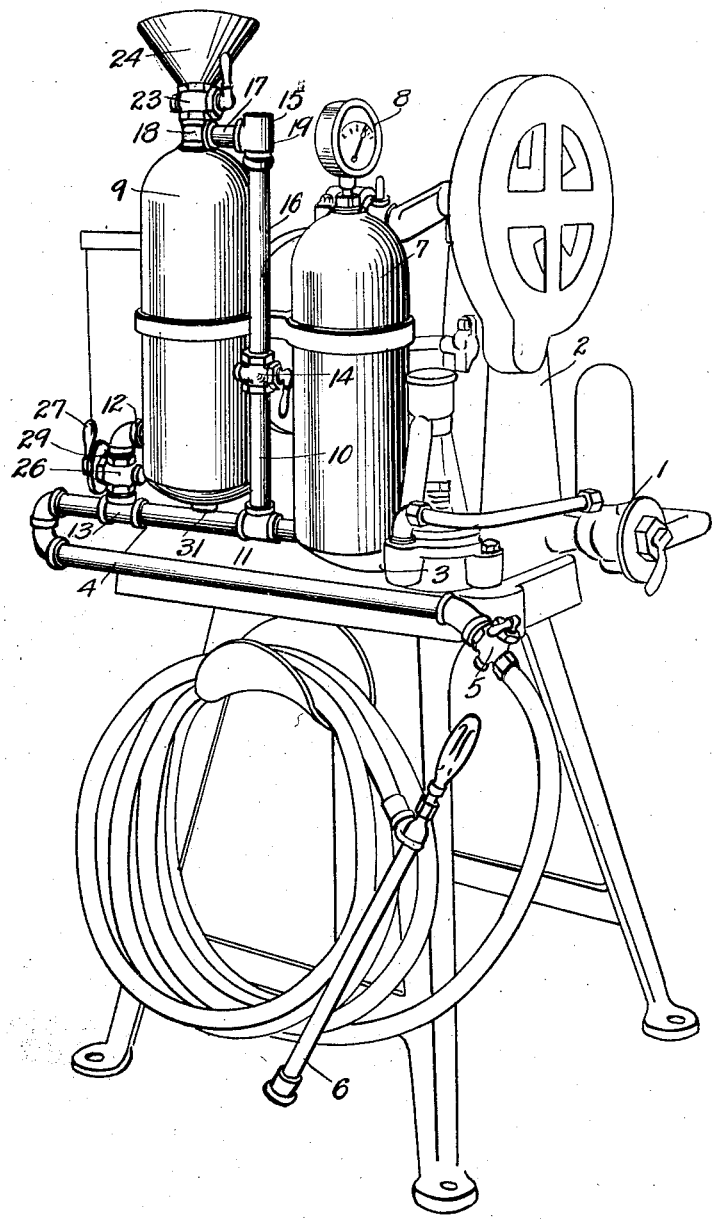
Fig. 1 is a perspective view of spraying apparatus equipped with my device for mixing and proportioning the ingredients of the spray material.
Figures 2, 3:
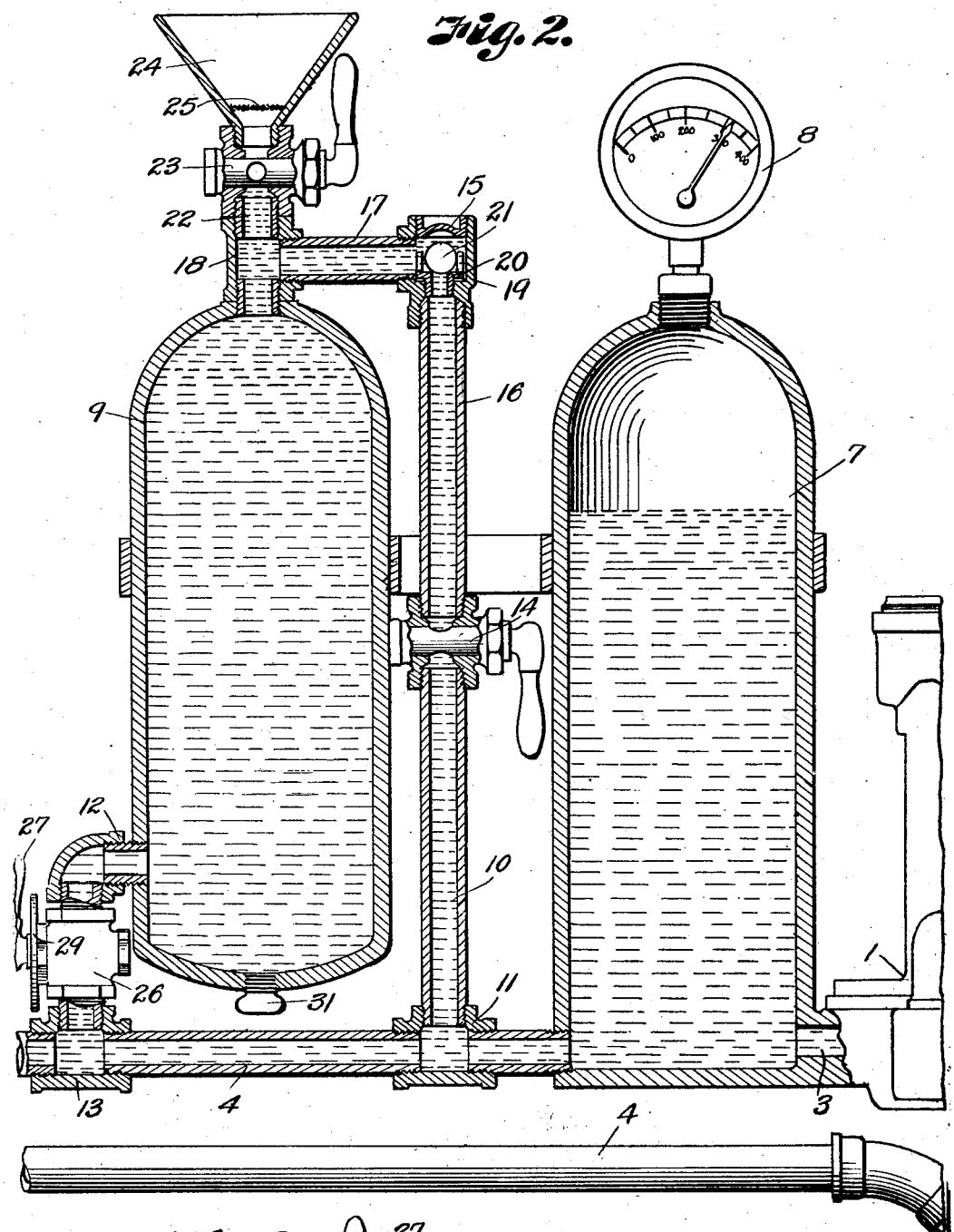
Fig. 2 is a central vertical section of the device, adjacent parts of the apparatus including the discharge tube being shown fragmentarily.
Fig. 3 is an elevation of a valve and dial for controlling the proportion of an auxiliary ingredient to the primary spray material.

Referring in detail to the drawings:

1 designates a spray machine or apparatus of ordinary construction including a pump 2, a discharge pipe 3 for conducting fluid under pressure from the pump, and a discharge tube 4 connected to the discharge pipe and having a valve 5 and a nozzle 6.

The apparatus may include a pressure tank 7 interposed in the discharge pipe 3 and in which suitable pressure, for example 300 pounds per square inch may be built up for discharging the fluid. A pressure guage 8 is connected to the tank. The discharge pipe is connected into the lower end of the tank.

The apparatus shown is such as commonly used for washing automobiles and the like, and represents one of many types of fluid-discharging devices to which my invention may be applied.

Mounted on the machine adjacent the pressure tank is a container 9 for an auxiliary spray substance. A tube 10 connected to the discharge pipe by a T 11 leads into the upper end of the container, and an outlet nipple 12 is mounted in the wall of the container adjacent the lower end thereof and connected to the discharge pipe through a T 13, whereby by-passing of fluid from the pump through the container is provided for.

A shut-off valve 14 in the tube 10 provides for manual control of flow of fluid therethrough, and a back pressure valve 15 in the tube is adapted to prevent movement of fluid from the container back into the tube and particularly to retain pressure values built up in the container by passage of fluid under pressure thereinto.

The tube 10 preferably includes a perpendicular portion 16 in which the cut-off valve is located and a horizontal portion 17 connected to a neck 18 of the container, the valve 15 including a cage-like body 19 screw-threadedly connected to the two portions, a seat 20 screw-threadedly mounted in the body, and a ball 21 movable away from the seat under the influence of pressure of fluid from the pump or tank.

Screw-threadedly mounted in the neck 18 of the container is a nipple 22 having a manually operable valve 23 which may be opened for introducing spray material into the container, or closed to retain the material and seal the neck when fluid is admitted under pressure through the tube 10.

A funnel 24 is mounted on the nipple 22 and provided with a screen 25 having meshes substantially equal in area to the minimum opening in the spray nozzle, for conveniently supplying material to the container in suitable condition.

A valve 26 is located at the outlet of the container, and preferably connected to the outlet nipple 12 and T 13, for controlling flow of the material from the container, and includes a handle 27 having a pointer 28 and a disk 29 having annularly disposed graduations 30 representing the extent of effective area of the valve passage at different positions of the valve, whereby the proportionate amounts of auxiliary material flowing from the container may be regulated and indicated.

A drain plug 31 is further provided in the bottom of the container, for draining the same of spray material or of a cleaning solution introduced for cleansing the container.

My device may be incorporated in spraying apparatus at the time of manufacture of the latter, or applied as an attachment.

Apparatus provided with the attachment as above described may be employed for any purpose for which two or more spraying substances are required.

When adapted for washing automobiles, and provided with a pressure tank, the apparatus may be used as follows:

A source of water supply is connected to the pump, since water in this instance comprises the primary spray material for the major portion of the washing operation.

The shut-off valve in the by-passing tube 10, the outlet valve, and the discharge pipe valve 5 are closed.

Kerosene, distillate, crank-case drainings or like substances immiscible with water, and adapted to dissolve and soften deposits on the surfaces to be cleaned, is introduced into the container, in sufficient amount so that it does not entirely fill the same. The valve in the neck of the container is then closed.

The pump is then started, to build up pressure in the pressure tank to the desired value, a cushion of air being retained in the top of the tank.

The shut-off valve 14 is then opened, and the water moves under pressure from the bottom of the pressure tank through the tube 10, displacing the ball valve, into the upper end of the container, and downwardly into contact with the auxiliary spray material, intermingling therewith. The stream of water will continue to move into the container and will violently agitate the oil therein to effect thorough mingling, until the pressures on the two sides of the ball valve are equalized.

The outlet valve from the container and the valve in the discharge tube may then be opened, to permit flow of spray material. The outlet valve will be set at a suitable position to admit a desired amount of the auxiliary material comprising mingled oil and water into the stream of clear water coming directly from the pump.

Ordinarily the outlet control valve 26 and discharge tube valve 5 will be opened substantially simultaneously and immediately after the shut-off valve is opened to admit water to the oil container, since the mingling of water with the oil, and the balancing of pressures, occur quickly, and it is desirable to discharge the mixture while in agitated condition.

It is apparent that the water may move at substantially equal pressures directly through the discharge pipe and through the container, so that the proportion of material admitted from the container to the stream of water may be accurately determined and controlled, for example, to provide a combination for spraying including nine parts of clear water and 1 part of the mixture of water and oil in the container.

The invention provides easily and accurately operated means for delivering proportioned mixtures through a spray nozzle, whereby one ingredient may be segregated from another so that it need not pass through the pump, and whereby an auxiliary stream of the primary spray material may be moved under pressure into and through an auxiliary spray material, to condition the auxiliary material for intermingling effectively with the main stream.

While the auxiliary material has been described as a solvent or softening agent in liquid form, material may be provided in any suitable form for a desired purpose, for example as a powder and deposited in the container, to be acted on by the streams of primary spray fluid, the outlet valve being kept closed to give opportunity for the primary fluid to act on the auxiliary material.

The water passing under pressure through the discharge pipe has suction effect on the auxiliary material in the container when the outlet valve is open, to cooperate with the pressure effect of the portion of the stream admitted to the top of the container to cause the auxiliary spray material to move into the stream of primary spray fluid.

Attention is called to the fact that when the shut off valve 14 and the control valve 26 are closed, the machine may be utilized for spraying the primary spray material directly through the discharge tube 4 without the secondary spray material as when the machine is used for washing preparatory to the application of the mixed spray or when rinsing to wash off the mixed spray after it has been applied.

What I claim and desire to secure by Letters Patent is:

1. The method of adding a secondary spray material to a confined stream of primary spray material having different specific gravity from the secondary material, comprising confining the secondary material and a body of primary material, passing a portion of the stream through the secondary material into the body of primary material to form a mixture of primary and secondary material, and passing the mixture into the stream of primary material.

2. The method of adding a secondary spray fluid having lower specific gravity than a primary fluid to a stream of said primary fluid, including confining portions of the primary and secondary fluid to form a body of secondary fluid supported by a body of primary fluid, and by-passing a portion of the stream of primary fluid first through the body of secondary material to pick up secondary fluid and force portions of the same through the body of primary fluid.

3. The method of adding a secondary spray fluid having lower specific gravity than a primary fluid to a stream of said primary fluid, including confining portions of the primary and secondary fluid to form a body of secondary fluid supported by a body of primary fluid, by-passing a portion of the stream of primary fluid first through the body of secondary material to pick up secondary fluid and force portions of the same through the body of primary fluid, effecting mixing of the secondary fluid with portions of the confined body of primary fluid and conducting the mixed fluids to the main stream of primary fluid from an intermediate position with reference to the body of primary fluid.

In testimony whereof I affix my signature.

EARL JOHNSON.